(12) United States Patent
Goranson

(10) Patent No.: US 7,109,447 B2
(45) Date of Patent: Sep. 19, 2006

(54) CONTROL SYSTEM FOR COOKING APPLIANCE EMPLOYING CONVECTION AND RADIANT COOKING

(75) Inventor: James A. Goranson, Williamsburg, IA (US)

(73) Assignee: Maytag Corporation, Newton, IA (US)

( * ) Notice: Subject to any disclaimer, the term of this patent is extended or adjusted under 35 U.S.C. 154(b) by 7 days.

(21) Appl. No.: 10/991,859

(22) Filed: Nov. 19, 2004

(65) Prior Publication Data

US 2005/0236388 A1    Oct. 27, 2005

Related U.S. Application Data

(60) Provisional application No. 60/560,279, filed on Apr. 8, 2004.

(51) Int. Cl.
*H05B 1/02* (2006.01)
(52) U.S. Cl. .................. 219/501; 219/414; 219/483; 307/39
(58) Field of Classification Search ................ 219/490, 219/497, 501, 499, 505, 483–486, 411–414; 307/39–41
See application file for complete search history.

(56) References Cited

U.S. PATENT DOCUMENTS

| | | | |
|---|---|---|---|
| 2,647,198 A * | 7/1953 | Lautner ..................... 392/360 |
| 3,560,824 A * | 2/1971 | Burke ........................ 318/806 |
| 3,752,956 A | 8/1973 | Cahill et al. |
| 3,927,345 A | 12/1975 | Licata et al. |
| 4,328,408 A | 5/1982 | Lawson |
| 4,332,992 A | 6/1982 | Larsen et al. |
| 4,335,290 A | 6/1982 | Teich |
| 4,395,233 A | 7/1983 | Smith et al. |
| 4,720,623 A | 1/1988 | DiCesare et al. |
| 4,865,864 A | 9/1989 | Rijswijck |
| 4,869,876 A | 9/1989 | Arfman et al. |
| 4,923,681 A | 5/1990 | Cox et al. |
| 4,940,869 A | 7/1990 | Scholtes et al. |
| 5,254,823 A | 10/1993 | McKee et al. |
| 5,347,104 A * | 9/1994 | Morishima et al. ...... 219/457.1 |
| 5,438,914 A | 8/1995 | Höhn et al. |
| 5,668,920 A * | 9/1997 | Pelonis ....................... 392/361 |
| 5,756,974 A | 5/1998 | Hong |
| 5,805,767 A * | 9/1998 | Jouas et al. ................. 392/373 |
| 5,861,720 A | 1/1999 | Johnson |
| 6,060,701 A | 5/2000 | McKee et al. |
| 6,097,000 A | 8/2000 | Frasnetti et al. |
| 6,218,650 B1 | 4/2001 | Tsukamoto et al. |
| 6,262,396 B1 | 7/2001 | Witt et al. |
| 6,262,406 B1 | 7/2001 | McKee et al. |
| 6,291,808 B1 | 9/2001 | Brown |

(Continued)

*Primary Examiner*—Mark Paschall
(74) *Attorney, Agent, or Firm*—Diederiks & Whitelaw, PLC

(57) ABSTRACT

A cooking appliance includes a heating system which is preferably capable of combining radiant, convection, microwave and conduction heating techniques to perform a cooking operation. The cooking appliance includes a convection fan and at least one heating device. A controller is provided to regulate a triac to create a variable fan speed and variable heater intensity through phase angle firing. Essentially, an AC waveform provided to the fan motor and/or the heater resistor travels through the triac which is turned on by the controller at predetermined points in the AC waveform, with the delay from a zero point waveform crossing functioning to reduce the amount of power sent to the heater resistor and fan motor. When the signal from the controller is removed, the triac advantageously turns off at the next zero crossing of the AC waveform such that an operationally and economically effective control system is provided.

19 Claims, 6 Drawing Sheets

U.S. PATENT DOCUMENTS

| | | |
|---|---|---|
| 6,307,185 B1 | 10/2001 | Loveless |
| 6,337,468 B1 | 1/2002 | Worthington et al. |
| 6,376,817 B1 | 4/2002 | McFadden et al. |
| 6,384,381 B1 | 5/2002 | Witt et al. |
| 6,403,937 B1 | 6/2002 | Day et al. |
| 6,472,647 B1 | 10/2002 | Lee et al. |
| 6,525,301 B1 * | 2/2003 | Graves et al. .............. 219/702 |
| 6,528,773 B1 | 3/2003 | Kim et al. |
| 6,541,746 B1 | 4/2003 | Kim et al. |
| 6,566,638 B1 | 5/2003 | Brown |
| 6,595,117 B1 | 7/2003 | Jones et al. |
| 6,603,102 B1 | 8/2003 | Brown et al. |
| 2002/0134778 A1 | 9/2002 | Day et al. |
| 2003/0085221 A1 | 5/2003 | Smolenski et al. |
| 2005/0091878 A1 * | 5/2005 | Yang et al. ................... 34/549 |

* cited by examiner

CONTROL SYSTEM FOR COOKING APPLIANCE EMPLOYING CONVECTION AND RADIANT COOKING

CROSS-REFERENCE TO RELATED APPLICATION

The present application claims the benefit of U.S. Provisional Patent Application Ser. No. 60/560,279 entitled "Control System for Cooking Appliance Employing Convection and Radiant Cooking" filed Apr. 8, 2004.

BACKGROUND OF THE INVENTION

1. Field of the Invention

The present invention pertains to the art of cooking appliances and, more particularly, to a system for controlling both a fan and heater in a compact cooking appliance capable of combining radiant, convection, conduction and microwave heating techniques to perform a cooking operation.

2. Discussion of the Prior Art

There exist a wide range of cooking appliances on the market. Many of these cooking appliances are designed for use in cooking various types of food products in different ways. For instance, where more conventional cooking appliances generally relied upon radiant energy as the sole heat source, more recent trends combine a radiant heat source with convection, microwave or conduction heating techniques, thereby increasing the versatility of the cooking appliance while potentially shortening required cook times. In particular, the prior art contains examples of appliances that combine radiant and convection cooking; convection, microwave and radiant cooking; and microwave, convection and conduction heating techniques.

Regardless of the existence of these known arrangements, there still exists a need for a cooking appliance that combines each of radiant, convection, microwave and conduction heating techniques in an efficient and effective manner to handle a wide range of food items. Particularly, there exists a need for a cooking appliance that can be used to rapidly prepare food products that require numerous different heat sources for full and complete cooking. For example, the rapid preparation of commercially produced, open-faced grilled sandwiches raises various cooking concerns. Open-faced grilled sandwiches require, at the very least, that heat be directed both downward onto an upper portion of the sandwich and upward onto a lower bun portion of the sandwich. In most cases this is accomplished by passing the open-faced sandwich on a conveyor belt through an oven between opposing radiant heat sources. While effective to a degree, the process can be time consuming and really does not result in a uniform heating of the meat, cheese and/or other toppings on the bread, nor an even toasting of the bread itself. In addition to this potential problem, a dual radiant oven of this type is simply not suitable for many other applications. For instance, an additional microwave oven or the like would typically be employed to heat soup or other liquid-based food items.

Regardless of the variety of known cooking appliances, there exists the need for a versatile cooking appliance that can preferably take advantage of radiant, convection, microwave and conductive cooking techniques such that the appliance can be used to rapidly and effectively cook a wide range of food items. When providing such a versatile cooking appliance, it is desirable to have a requisite convection fan run at variable speeds and the radiant heater run at different output levels. In particular, during various phases of a cooking operation, it is desired to alter the operation of both the fan and heater to obtain the desired cooking effect. Therefore, there exists a need for a control apparatus for a cooking appliance that can effectively and efficiently regulate both fan speed and radiant heater output.

SUMMARY OF THE INVENTION

The present invention is directed to a cooking appliance including a cooking chamber having top, bottom, rear and opposing side walls, at least one radiant heating element exposed to the cooking chamber, a convection fan, a microwave heating device having at least one rotatable antenna and a conduction heating device, all of which can be operated in combination to perform a cooking operation. The cooking appliance also includes an air plenum arranged at a top portion of the cooking chamber. The air plenum is bifurcated so as to define two distinct passages separated by an angled divider. The angled divider defines a tapered air delivery portion and a tapered exhaust portion within the bifurcated air plenum. The tapered air delivery portion guides a convective air flow through an air emitter plate positioned at the top wall of the cooking chamber.

In a preferred embodiment of the invention, the air emitter plate includes a recessed, serpentine-like channel having a plurality of openings that lead to the air delivery portion. Nested within the recessed channel is the radiant heating element. With this arrangement, not only does the radiant heating element deliver radiant heat, but heat is transferred from the radiant heating element to the convection cooking air delivered into the cooking chamber. The air currents are furnished by a convection fan positioned in a fan housing, preferably arranged behind the cooking chamber.

In accordance with the invention, the cooking appliance includes a cooling fan arranged in a housing located behind the convection fan housing. The cooling fan draws an ambient air flow into the cooking appliance through an air intake that extends below the cooking chamber. A first portion of the intake air flow is preferably directed to the convection fan, while a second or major portion of the air flow is used to cool control elements, such as control boards, electronics, relays and the like arranged in the appliance. Preferably, the cooling fan is drivingly connected to the convection fan. With this arrangement, activation of the cooling fan establishes both the intake air flow for cooling system components and a fresh convection air flow supply that combines with other heating techniques to perform the combined cooking operation.

A particular aspect of the present invention concerns a control system for regulating the convection fan and radiant heater. In accordance with the most preferred embodiment of the invention, a circuit, including a relay and a triac, is arranged on a control board. The circuit is specifically designed to control the convection fan through phase angle firing to run at variable speeds and the radiant heater to run at various output levels. By modifying the AC waveform delivered to the convection fan and radiant heater, the control system can effectively alter the power delivered to these two devices in order to allow for the variable fan speeds and variations in radiant heater output. Essentially, a microprocessor is provided to turn the triac on and off at various points in the AC waveform, thereby establishing waveform chopping operations. When the control signal from the microprocessor is removed, the triac turns off at the next zero crossing of the waveform. By turning the AC voltage on at various points in the AC waveform, the triac essentially limits the power going through the controlled components which, in this case, constitute the fan motor and the heater. In this manner, a relatively inexpensive, yet highly effective, way of controlling both the convection fan and radiant heater is achieved.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
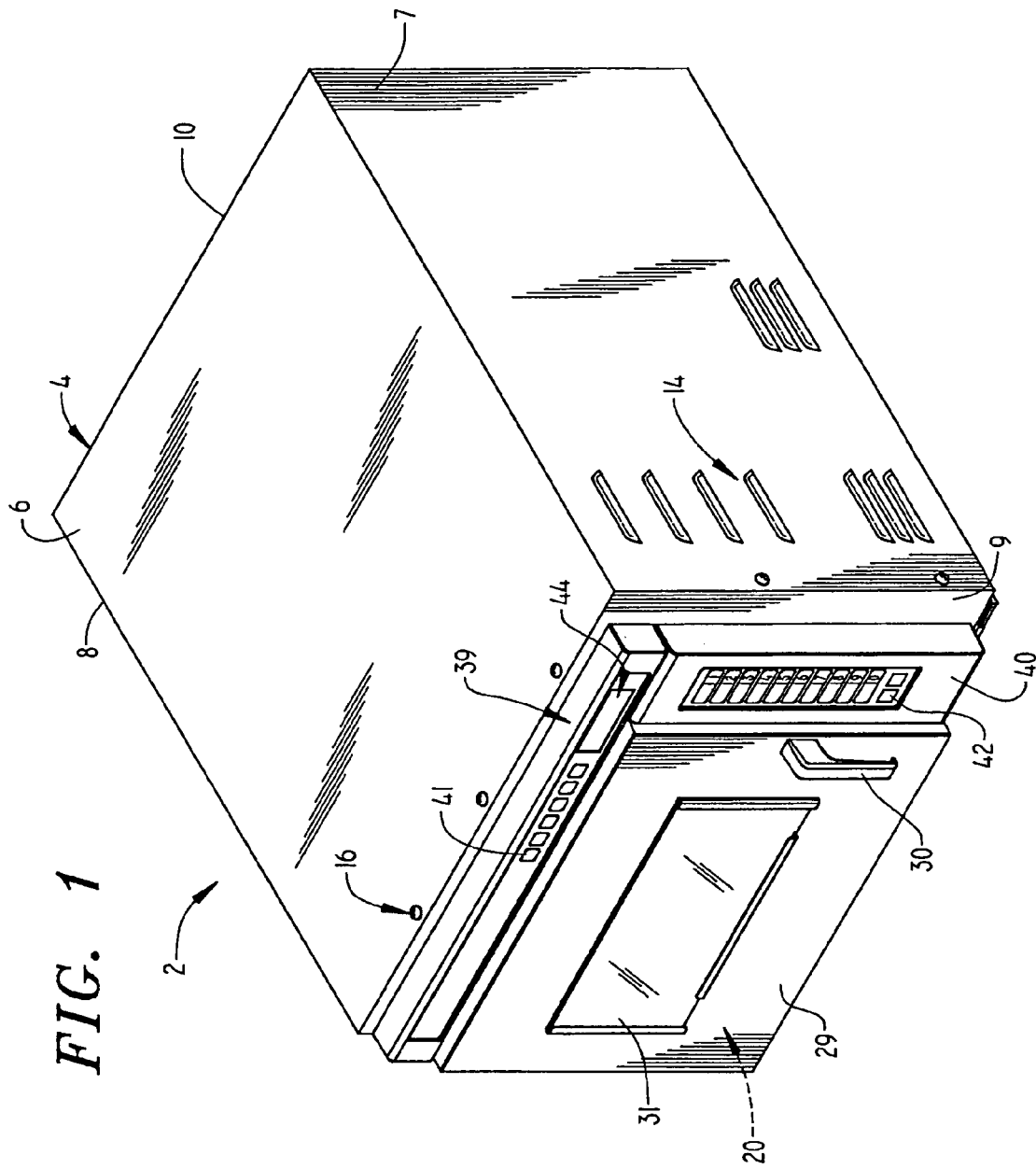
FIG. 1 is an upper right perspective view of a cooking appliance incorporating a combination heating system constructed in accordance with the present invention.
Figure 2:
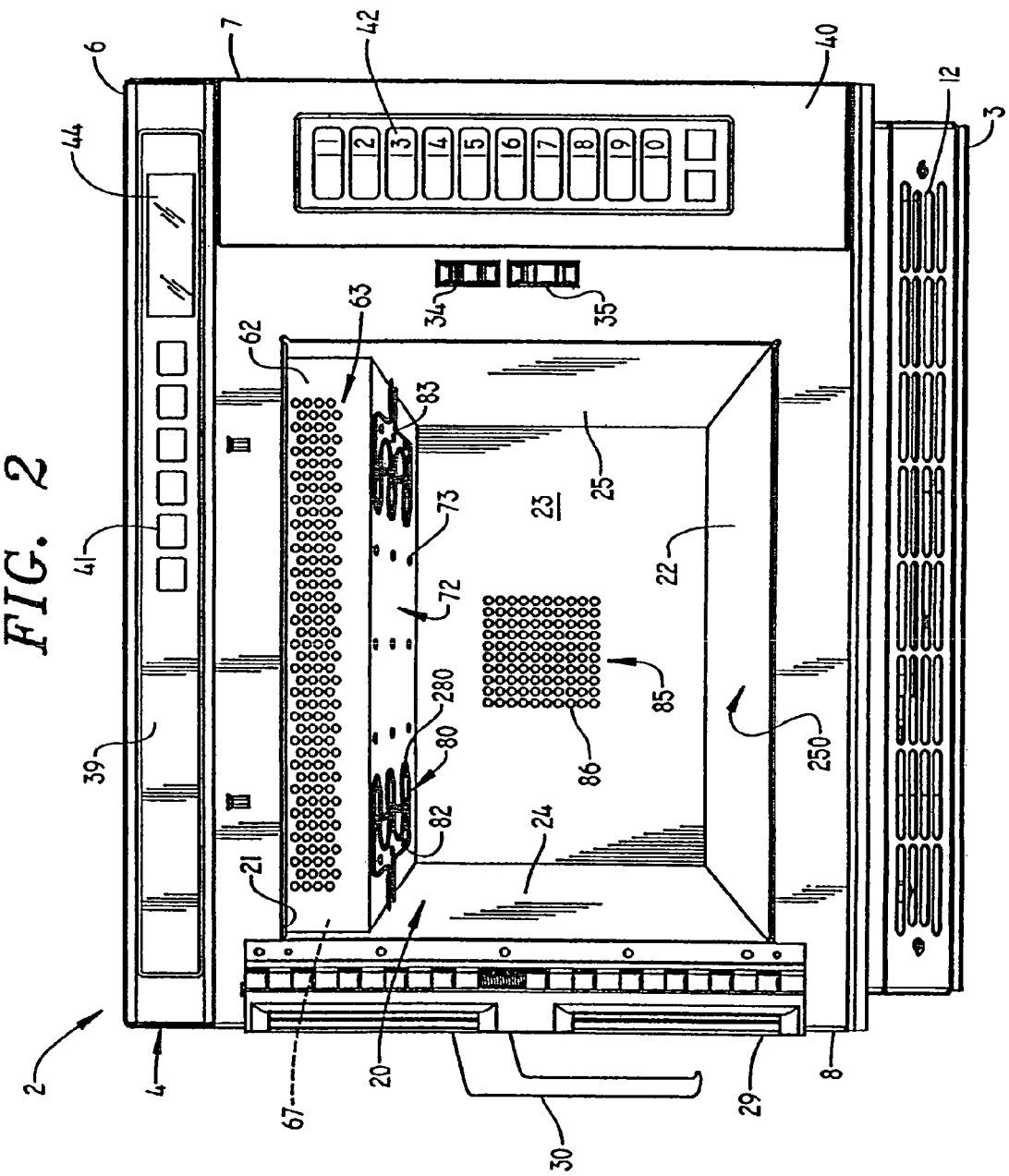
FIG. 2 is a front view of the cooking appliance of FIG. 1 with a cooking chamber of the appliance exposed.
Figure 3:
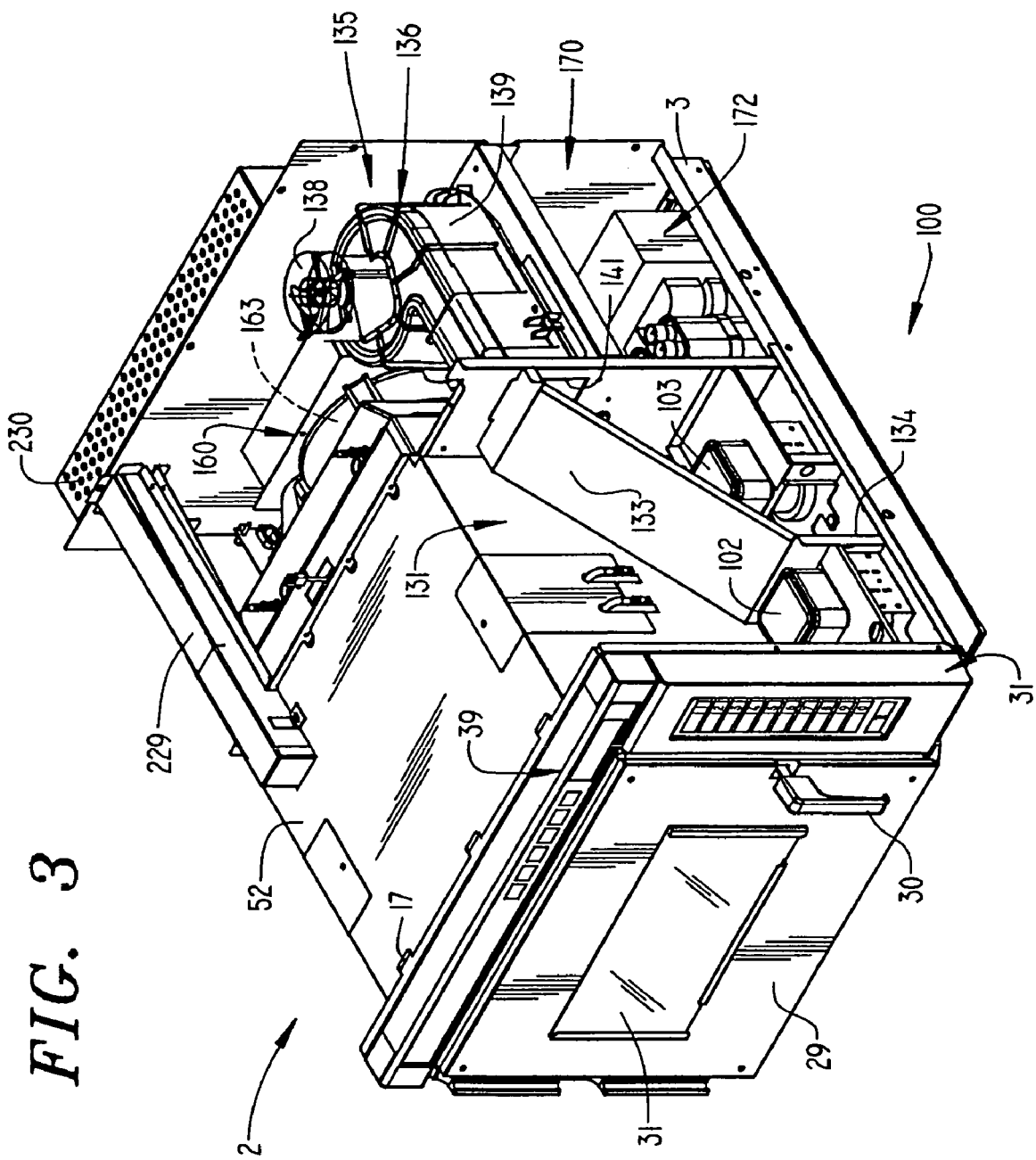
FIG. 3 is an upper right perspective view of the cooking appliance of FIG. 1 with an outer cabinet portion of the appliance removed.

With initial reference to FIGS. 1–3, a cooking appliance constructed in accordance with the present invention is generally indicated at 2. As shown, cooking appliance 2 includes a base frame 3 to which is secured an outer cabinet shell 4 having top and opposing side panels 6–8. Cooking appliance 2 is also provided with a front face or wall 9 and a rear panel 10. Arranged at a lower portion of front wall 9 is an intake air vent 12 through which, as will be discussed more fully below, an ambient air flow enters into cabinet shell 4. In addition, cabinet shell 4 includes a plurality of air discharge vents, indicated generally at 14, arranged on side panel 7. Vents 14 enable cooling air to exit from within cooking appliance 2, thereby removing heat from within cabinet shell 4. Cabinet shell 4 is secured over base frame 3 through a plurality of fasteners 16, with the fasteners 16 arranged along front wall 9 being secured at tabs 17 (see FIG. 3).

As best seen in FIG. 2, arranged within cabinet shell 4 is a cooking chamber 20 having top, bottom, rear and opposing side walls 21–25. In a manner known in the art, a door 29 is pivotally mounted to front wall 9 to selectively enable access to cooking chamber 20. Toward that end, door 29 includes a handle 30 and a window 31 for viewing the contents of cooking chamber 20 during a cooking operation. Although not shown, window 31 includes a screen (not shown) that prevents microwave energy fields from escaping from within cooking chamber 20 during a cooking operation. Handle 30 is adapted to interconnect to upper and lower latching mechanisms 34 and 35 so as to retain door 29 in a closed position and prevent operation of cooking appliance 2 whenever door 29 is opened.

Cooking appliance 2 is shown to include upper and side control panels 39 and 40, each of which includes a respective set of control buttons or elements 41 and 42. The sets of control elements 41 and 42, in combination with a digital display 44, enable a user to establish particular cooking operations for cooking appliance 2. For instance, control elements 41 can be used to establish the heating parameters of cooking appliance 2, while control elements 42 enable stored cooking times and/or operations to be readily selected. Since the general programming of cooking appliance 2 does not form part of the present invention, these features will not be described further herein.

As further shown in FIG. 2, cooking appliance 2 includes a plenum cover 62 arranged at an upper portion of cooking chamber 20. As will be discussed more fully below, plenum cover 62 includes a plurality of openings, indicated generally at 63, that enable an exhaust air flow to pass from cooking chamber 20. Arranged behind plenum cover 62 is a bifurcated air plenum 67 (see FIG. 4) that provides air flow management for cooking chamber 20 during a cooking operation. More specifically, an air emitter plate 72 extends rearward from a lower portion of plenum cover 62 to rear wall 23 of cooking chamber 20. In accordance with a preferred embodiment of the invention, air emitter plate 72 includes a plurality of strategically placed openings 73 that are exposed to a lower portion of bifurcated plenum 67. A radiant heating device 80, including first and second radiant heating elements 82 and 83 (see FIG. 2), preferably extends along air emitter plate 72. More specifically, radiant heating elements 82 and 83 are constituted by sheathed, electric resistive elements, each having a serpentine-like pattern that extends fore-to-aft across a section of air emitter plate 72. In the most preferred embodiment, each heating element 82, 83 is capable of delivering 900 watts of energy into cooking chamber 20. More preferably, each heating element 82, 83 is configured to produce 60 watts/in$^2$ of power. Cooking appliance 2 also includes a convection air intake vent 85 having a plurality of convection air openings 86 positioned on rear wall 23 of cooking chamber 20.

Figure 4:
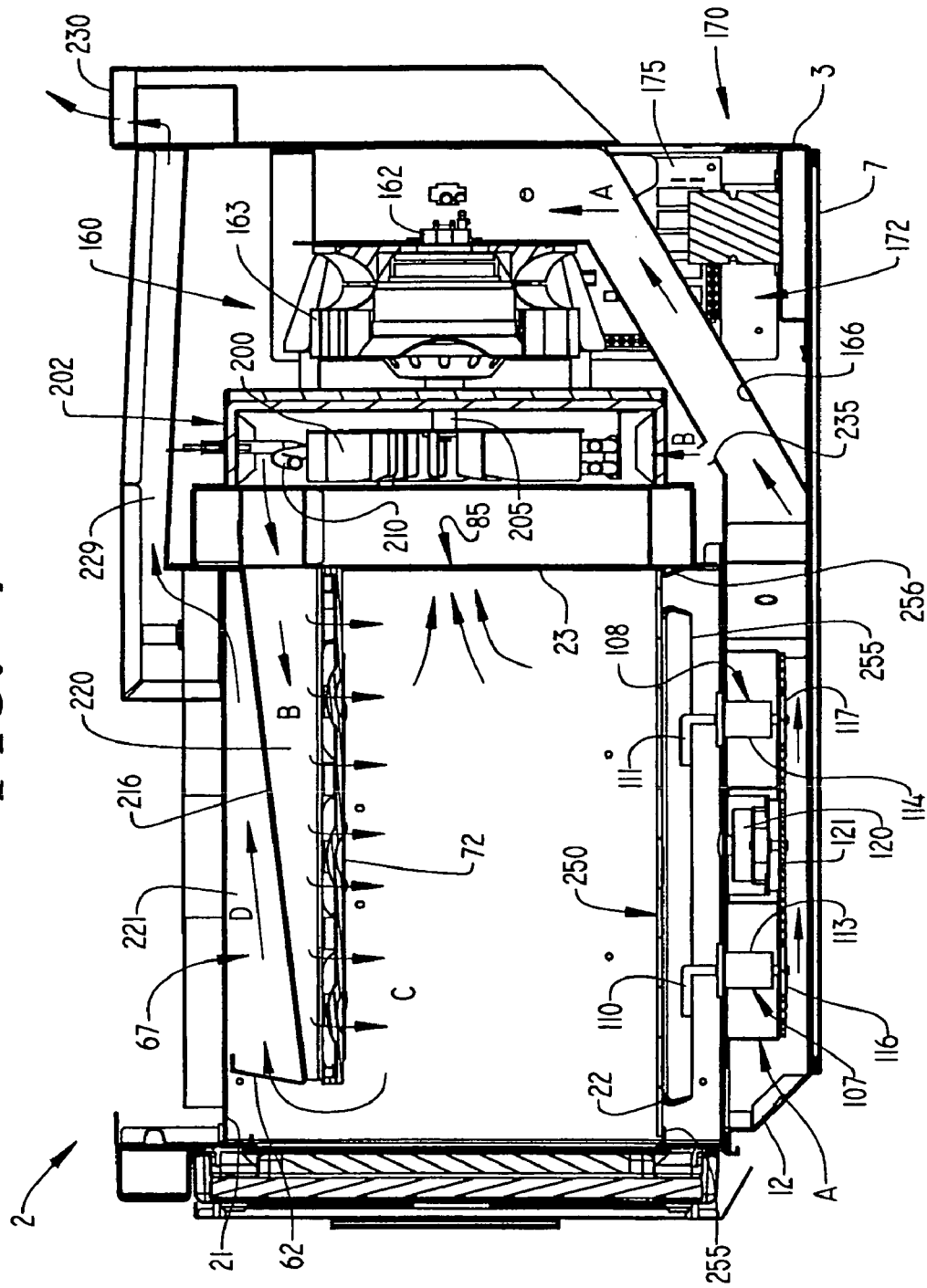
FIG. 4 is a cross-sectional side view of the cooking appliance constructed in accordance with the present invention.

As shown best with reference to FIGS. 3 and 4, cooking appliance 2 includes a microwave heating device 100 incorporating first and second magnetrons 102 and 103 (see FIG. 3) that are adapted to generate and direct a combined microwave energy field into cooking chamber 20. As seen in FIG. 4, first and second magnetrons 102 and 103 include respective first and second rotating antenna assemblies 107 and 108. Each rotating antenna assembly 107, 108 includes an antenna portion 110, 111, a housing portion 113, 114 and a gear member 116, 117 respectively. In accordance with a preferred form of the invention, antenna assemblies 107 and 108 are arranged below bottom wall 22 of cooking chamber 20. In further accordance with the invention, antenna portions 110 and 111 are rotated so as to develop a uniform, constructive standing microwave energy field within cooking chamber 20. That is, antenna assemblies 107 and 108 are rotated by a drive motor 120 having a drive gear 121 which is drivingly connected to each of gears 116 and 117 of antenna assemblies 107 and 108, preferably through a gear train (not shown).

Referring to FIG. 3, magnetrons 102 and 103 are arranged in a microwave housing portion 131 of cooking appliance 2. Microwave housing portion 131 includes an angled divider 133 and a vertical divider 134. Although not shown, vertical divider 134 is formed with an opening leading beneath magnetron 102. In order to prevent magnetrons 102 and 103 from overheating, cooking appliance 2 is provided with a microwave cooling system 135 that includes a blower assembly 136 which is drivingly connected to a drive motor 138 positioned within a duct 139. Duct 139 extends from drive motor 138 to an opening 141 arranged below angled divider 133. With this arrangement, activation of cooking appliance 2 causes drive motor 138 to rotate, whereby blower assembly 136 establishes a cooling air flow. The cooling air flow is guided through opening 141 toward magnetron 103 due to the presence of angled divider 133. The cooling air flow circulates about magnetron 103, through vertical divider 134, across magnetron 102 and up along angled divider 133, in order to provide a cooling effect for magnetrons 102 and 103, before exiting cooking appliance 2 through vents 14.

In addition to microwave cooling system 135, cooking appliance 2 includes an air intake system 160 having an associated drive motor 162 coupled to an impeller 163. Drive motor 162 rotates impeller 163 so as to draw in an ambient air flow A through intake air vent 12. Intake air vent 12 leads to an intake air duct 166, while passing about drive motor 120 for antenna assemblies 107 and 108. A majority of the air flow A is circulated within a rear control housing portion 170 in order to cool a plurality of electronic components 172, including a main control board 175 which is adapted to receive input and/or programming instructions through control elements 41, 42 in order to establish and set various cooking operations for cooking appliance 2.

In addition to driving impeller 163, drive motor 162 operates a convection fan 200 positioned within a convection fan housing 202 that, in the embodiment shown, is arranged behind rear wall 23 of cooking chamber 20. More specifically, convection fan 200 is drivingly connected for concurrent rotation with impeller 163 through a drive shaft 205 such that operation of drive motor 162 is translated to convection fan 200 to establish a convective air flow B. Convective air flow B is passed over a convection air heating element 210 and delivered into cooking chamber 20 through openings 73 in air emitter plate 72. More specifically, as will be discussed further below, convective air flow B is directed into bifurcated air plenum 67 before passing into cooking chamber 20.

In further accordance with the preferred form of the invention, bifurcated air plenum 67 includes an angled divider plate 216 that defines a tapered air delivery portion 220 and a corresponding tapered exhaust portion 221. In the embodiment shown, air delivery portion 220 is essentially defined by air emitter plate 72, angled divider plate 216 and part of rear wall 23, while exhaust portion 221 is defined by plenum cover 62, top wall 21 and angled divider plate 216. In any event, air flow B developed through operation of convection fan 200 is heated by heating element 210, directed into air delivery portion 220 of bifurcated air plenum 67 and then lead into cooking chamber 20 through openings 73. The tapering of air delivery portion 220 is provided so that air initially entering bifurcated air plenum 67 from convection fan 200 passes through openings 73 in air emitter plate 72 with substantially the same pressure as air reaching an end portion (not separately labeled) of tapered air delivery portion 220.

As a portion of the cooking operation is constituted by convection heating, convective air flow B circulates about cooking chamber 20. This heated air flow has been found to particularly enhance the even cooking of a food item. As further represented in FIG. 4, a first portion of convective air flow B passes into convection air intake vent 85 through openings 86. The convective air flow B is heated/reheated by heating element 210 before being passed back into cooking chamber 20. At the same time, a second, preferably smaller portion of convective air flow B passes through openings 63 in plenum cover 62 and is directed out of cooking appliance 2. More specifically, plenum cover 62 leads into tapered exhaust portion 221. The exhaust air flow D entering into tapered exhaust portion 221 is passed upward into an exhaust duct 229 before exiting through an exhaust outlet 230 that, in the embodiment shown, is arranged at an upper rear portion of cooking appliance 2. To replace the lost air flow, convection fan 200 preferably draws or siphons a portion of air flow A. For this purpose, one or more openings 235 are provided in duct 166 in order to introduce fresh ambient air to the overall, circulating air flow. In this manner, certain cooking effluents, including moisture and steam, exit cooking chamber 20 through exhaust outlet 230, while a fresh supply of air is introduced into the remaining, recirculated air flow due to the presence of opening(s) 235.

In further accordance with the present invention, cooking appliance 2 includes a conductive heating device 250 that, in the most preferred form of the invention, defines bottom wall 22 of cooking chamber 20. Conductive heating device 250 is preferably constituted by a ceramic stone plate adapted to support food items within cooking chamber 20. Conductive heating device 250 advantageously provides a thermal conduction path for heating and browning of a food item. More specifically, upon activation of cooking appliance 2, radiant heat produced by heating elements 82 and 83 combines with convective air flow B generated by convection fan 200 to heat conduction heating device 250. Conductive heating device 250 is transparent to microwave energy so that microwave energy fields emitted by magnetrons 102 and 103 pass upward into cooking chamber 20 and further contribute to the overall cooking operation. In further accordance with the invention, conductive heating device 250 is supported upon a plurality of support brackets, such as those indicated at 255 and 256, to enable or facilitate removal of conductive heating device 250 for cleaning or other purposes.

Figure 5:
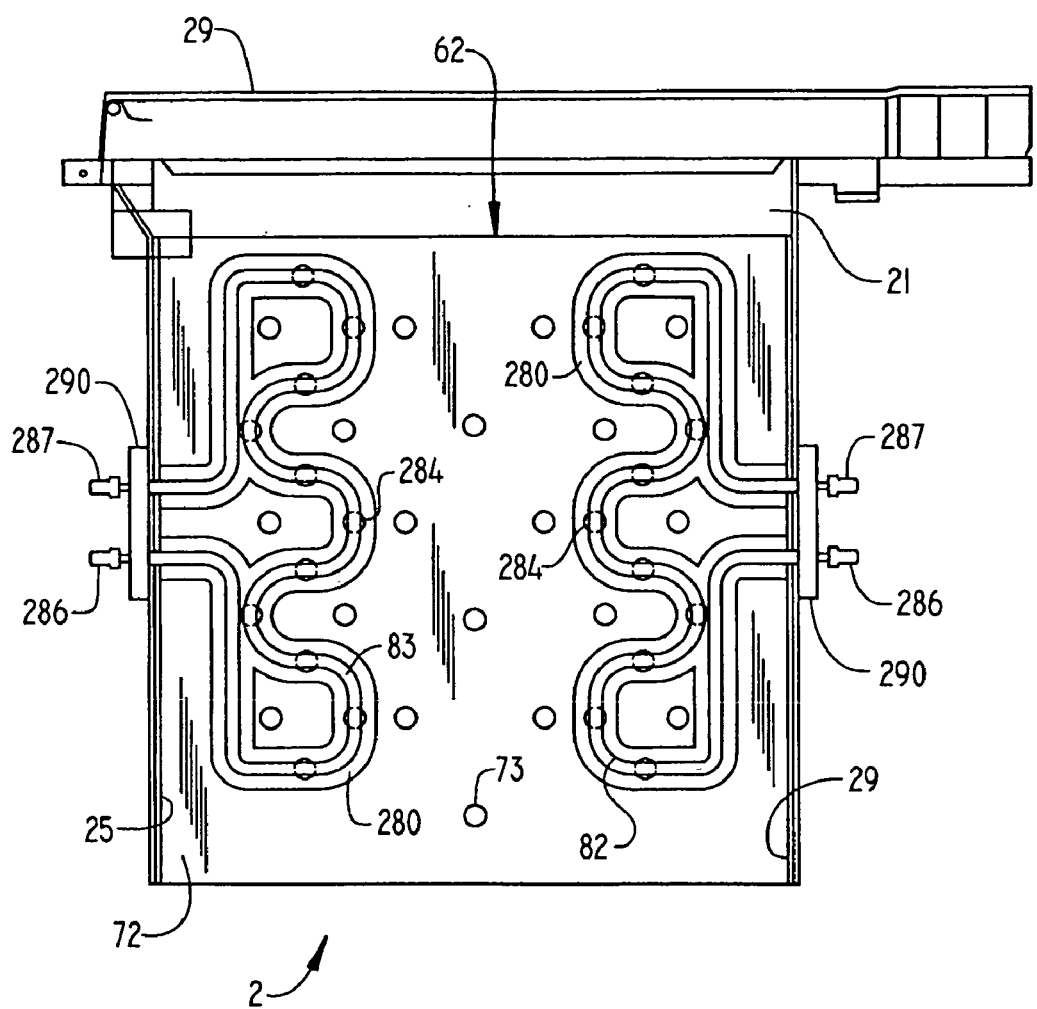
FIG. 5 is a plan view of a top portion of a cooking chamber of the appliance.

With particular reference to FIG. 5, air emitter plate 72 is preferably formed from anodized cast aluminum and provided with a pair of fore-to-aft extending recessed channels 280. Recessed channels 280 are provided with a plurality of openings 284. Heating elements 82 and 83 are nested within recessed channels 280 adjacent openings 284. As shown, each heating element 82, 83 includes a pair of electrodes 286 and 287 spaced from side walls 24 and 25 by an insulator 290. With this mounting arrangement, not only do heating elements 82 and 83 provide a source of radiant heat, but convective air flow B passing through openings 284 is heated by the additional thermal energy generated by heating elements 82 and 83 as air flow B passes from air delivery portion 210 of air plenum 67 into cooking chamber 20. Therefore, by being routed between, across and around respective ones of the various strategically placed openings 284, heating elements 82 and 83 evenly distribute thermal and infrared energy to the food being cooked.

With this overall combined cooking arrangement, a food item, for example, an open-faced sandwich placed within cooking chamber 20, can be exposed to a four-way combination cooking operation, i.e. radiant, microwave, convection and conductive heating techniques. The combination of the aforementioned heating techniques serves to cook the food item in an expeditious manner, while maintaining the required food quality. In addition, combining the aforementioned heating techniques enables cooking appliance 2 to be readily adapted to cook a wide range of food items in an efficient and effective manner, while also establishing an overall compact unit.

The above description of the preferred construction of cooking appliance 2 is provided for the sake of completeness and is covered by co-pending U.S. patent application entitled "Cooking Appliance including Combination Heating System" filed on even date herewith and incorporated herein by reference. The present invention is particularly directed to the arrangement and control of convection fan 200 and heating device 80. To this end, reference is made to FIG. 6 which schematically depicts a circuit of the control system for both convection fan 200 and heating device 80. As provided in accordance with the preferred embodiment shown, a standard 220 volt AC supply current, such as that typically employed in a household for appliances, is utilized. As an AC, 220 volt power supply is employed, the power is connected between two out-of-phase sources 300 and 301. This of course is quite different from the 110 volt supply typically found in a household, wherein one line is connected to neutral, while the other line is connected to a hot or live source. As both incoming lines are active in this case, a relay 310 is provided in the circuit, particularly for safety reasons. A controller 320, including a control board with a microprocessor (not individually labeled), is provided to regulate relay 310. Additionally, there is provided a triac 330 which allows current to travel therethrough only upon a signal from controller 320.

Essentially, triac 330 provides the capability of turning the power line on or off at various times. Rather than turning triac 330 on and keeping triac 330 on all the time during operation of cooking appliance 2, in accordance with the present invention, controller 320 only turns triac 330 on at various points in the AC waveform, i.e., a waveform chopping operation is performed, to effectively lower the overall power load. When a control signal from controller 320 is removed, triac 330 automatically turns off at the next zero crossing of the AC waveform. By turning the AC voltage on at various points in the AC waveform, triac 330 is essentially limiting the power going through the device or load, in this case, both convection fan 220 and heating device 80 simultaneously. At this point, it should be noted that other devices or loads, such as heating element 210, could be controlled in this manner as set forth in accordance with the present invention.

Figure 6:
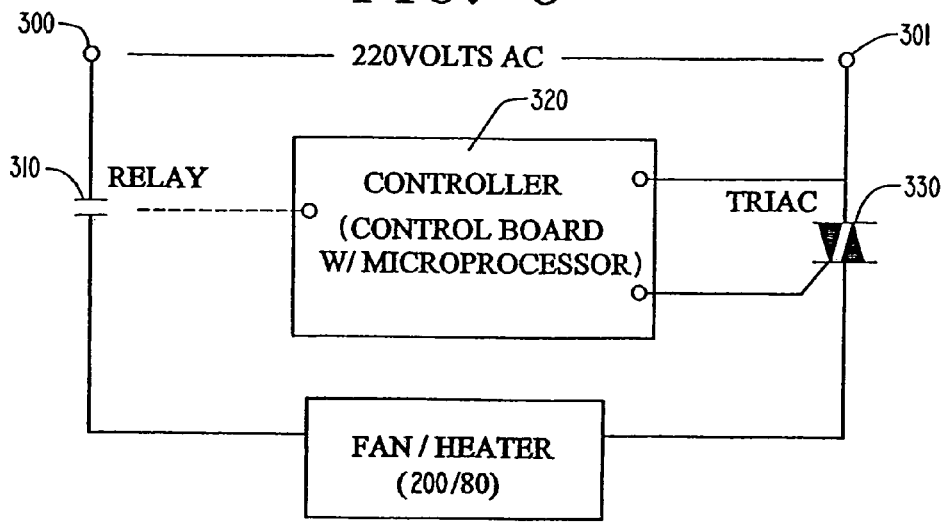
FIG. 6 is schematic drawing of a control circuit in accordance with the present invention.
Figure 7A:
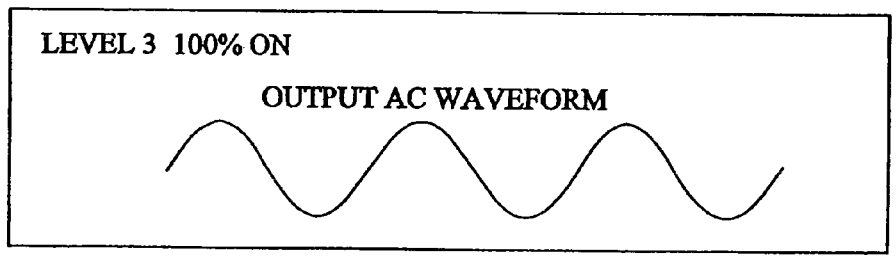
FIG. 7a is chart showing a waveform of the control circuit at a first level of operation.
Figure 7B:
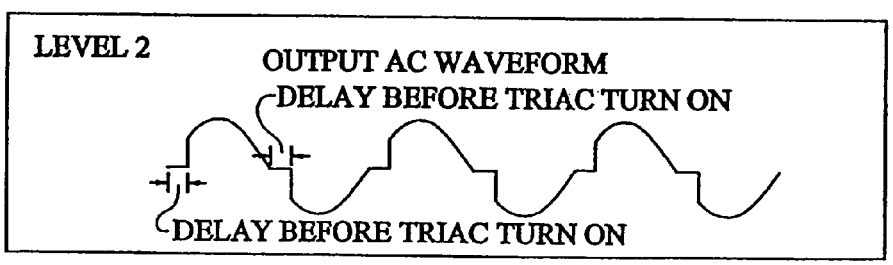
FIG. 7b is chart showing a waveform of the control circuit at another level of operation.
Figure 7C:
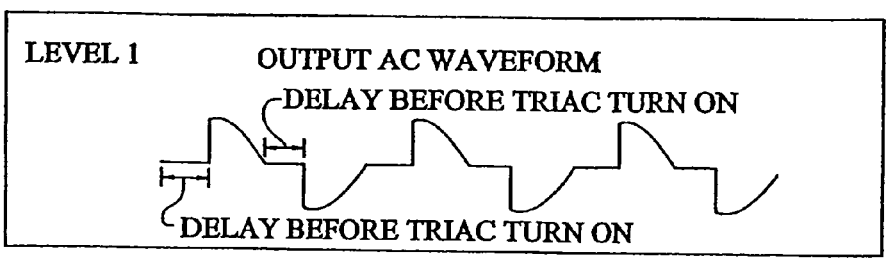
FIG. 7c is chart showing a waveform of the control circuit at a further level of operation.

Turning now to FIGS. 7a–7c, there is shown an example of the waveform produced by the controller 320 in combination with triac 330. In particular, this waveform is specifically for convection fan 220. Note, at a high level, when convection fan 220 is 100% on as shown in FIG. 7a, the AC waveform is a standard output AC waveform with no chopping. In other words, triac 330 is essentially on all the time and allows the passage of current. As represented in FIG. 7b, the speed of convection fan 220 has been reduced. The reduction actually occurs after the wavepoint hits a zero point. More specifically, there is a delay before triac 330 turns on and thus passes current as clearly marked in this figure. Finally, as illustrated in FIG. 7c wherein the speed of convection fan 220 has been reduced even further, the delay before triac 330 turns on and thus allows current to flow is quite long. Indeed almost half the waveform is prevented from traveling through triac 330 such that convection fan 220 is essentially receiving 50% power. Although described with respect to controlling convection fan 220, triac 330 preferably controls both heating device 80 and convection fan 220 with this arrangement as indicated in FIG. 6.

Therefore, the speed of convection fan 220 and the output of heating device 80 can be simultaneously controlled in accordance with the invention.

Based on the above, it should be readily apparent that triac 330 is employed to create a variable fan speed and variable heater intensity in convection cooking appliance 2. To accomplish the variance of fan speed and radiated heat output level, relay 310 and triac 330 are added to the control board of controller 320 to perform phase angle firing. Essentially, the AC waveform provided to both the fan motor or the heater resistor travels through triac 330 which is regulated by controller 320. Triac 330 is turned on at predetermined point in the AC waveform, with the delay from a zero point waveform crossing functioning to reduce the amount of power sent to the heater resistor and fan motor. When the signal from controller 320 is removed, triac 330 advantageously turns off at the next zero crossing of the AC waveform. In this manner, an operationally and economically effective control system is provided, preferably for multiple power loads simultaneously.

Although described with reference to a preferred embodiment of the present invention, it should be readily apparent to one of ordinary skill in the art that various changes and/or modifications can be made to the invention without departing from the spirit thereof. In general, the invention is only intended to be limited to the scope of the following claims.

I claim:

1. A convection cooking appliance comprising:
   a cabinet including top, bottom rear and opposing side walls;
   a cooking chamber including top, bottom, rear, opposing side walls and a frontal opening;
   a door movably mounted relative to the cooking chamber for selectively closing the frontal opening;
   a heating device provided in the cabinet for performing a portion of a cooking operation;
   a convection fan arranged in the cabinet to direct a convective air flow into the cooking chamber; and
   a control system for regulating a speed of the convection fan and an intensity of the heating device during a cooking operation by altering an AC waveform provided to the convection fan and the heating device, said control system including a triac, as well as a controller for turning on the triac at select points in the AC waveform to create a delay from a zero point crossing of the AC waveform, thereby simultaneously altering an amount of power sent to each of the convection fan and the heating device.

2. The cooking appliance according to claim 1, wherein the controller turns on the triac continuously to operate the convection fan and the heating device at full power.

3. The cooking appliance according to claim 2, wherein the controller prevents approximately half of the AC waveform from passing through the triac so as to operate the convection fan and heating device at half power.

4. The cooking appliance according to claim 1, wherein the AC waveform is generated from first and second out-of-phase sources.

5. The cooking appliance according to claim 4, wherein the triac is arranged in series between the second source and the heating device.

6. The cooking appliance according to claim 4, further comprising: a relay connected in series between the first source and the heating device.

7. The cooking appliance according to claim 6, wherein the triac is arranged in series between the second source and the heating device and in parallel with the relay.

8. A convection cooking appliance comprising:
a cabinet including top, bottom rear and opposing side walls;
a cooking chamber including top, bottom, rear, opposing side walls and a frontal opening;
a door movably mounted relative to the cooking chamber for selectively closing the frontal opening;
a heating device provided in the cabinet for performing a portion of a cooking operation;
a convection fan arranged in the cabinet to direct a convective air flow into the cooking chamber; and
means for regulating a speed of the convection fan and an intensity of the heating device during a cooking operation by altering an AC waveform provided to the convection fan and the heating device, said regulating means including a triac which is turned on at select points in the AC waveform to create a delay from a zero point crossing of the AC waveform, thereby simultaneously altering an amount of power sent to each of the convection fan and the heating device.

9. The cooking appliance according to claim 8, wherein the regulating means turns on the triac continuously to operate the convection fan and the heating device at full power.

10. The cooking appliance according to claim 9, wherein the regulating means prevents approximately half of the AC wave form to pass though the triac so as to operate the convection fan and heating device at half power.

11. The cooking appliance according to claim 8, wherein the AC waveform is provided by first and second out-of-phase sources.

12. The cooking appliance according to claim 11, wherein the triac is arranged in series between the second source of the AC waveform and the heating device.

13. The cooking appliance according to claim 11, wherein the regulating means further comprises a relay connected in series between the first source of the AC waveform and the heating device.

14. The cooking appliance according to claim 11, wherein the triac is arranged in series between the second source of the AC waveform and the heating device and in parallel with the relay.

15. A method of performing a cooking operation while varying a speed of a convection fan and an intensity of a heating device in a convection cooking appliance:
placing a food item onto a cooking chamber of the cooking appliance;
activating a heating device to create heat introduced into the cooking chamber by providing an AC source of power having an AC waveform to the heating device;
operating a convection fan to deliver a convective air flow into the cooking chamber by providing the AC source of power having the AC waveform to the convection fan; and
regulating a speed of the convection fan and an intensity of the heating device during the cooking operation by altering the AC waveform provided to both the convection fan and the heating device by turning on a triac, arranged between the AC source of power and each of the convection fan and the heating device, at select points in the AC waveform to create a delay from a zero point crossing of the AC waveform, thereby simultaneously altering an amount of power sent to each of the convection fan and the heating device.

16. The method of claim 15, wherein the speed of the convection fan and the intensity of the heating device are set at full power by continuously turning on the triac.

17. The method of claim 16, wherein the speed of the convection fan and the intensity of the heating device are set at half power by permitting only approximately half of the AC waveform to pass through the triac.

18. The method of claim 15, further comprising: activating a relay to complete a current path to both the convection fan and the heating device.

19. The method of claim 18, further comprising: bypassing the triac upon activating the relay to complete the current path to both the convection fan and the heating device.

* * * * *